(12) United States Patent
Nanda et al.

(10) Patent No.: US 11,989,432 B2
(45) Date of Patent: May 21, 2024

(54) REBUILDING SPACE ACCOUNTING COUNTERS IN MAPPING LAYER OF STORAGE APPLIANCES

(71) Applicant: EMC IP Holding Company LLC, Hopkinton, MA (US)

(72) Inventors: Bijayalaxmi Nanda, Edison, NJ (US); Dixitkumar Patel, Monroe, NJ (US); Vamsi K. Vankamamidi, Hopkinton, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 17/083,671

(22) Filed: Oct. 29, 2020

(65) Prior Publication Data
US 2022/0137813 A1 May 5, 2022

(51) Int. Cl.
*G06F 3/06* (2006.01)

(52) U.S. Cl.
CPC ............ *G06F 3/064* (2013.01); *G06F 3/0604* (2013.01); *G06F 3/0653* (2013.01); *G06F 3/0659* (2013.01); *G06F 3/0665* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,582,328 B1 | 2/2017 | Tao et al. | |
| 10,210,067 B1 | 2/2019 | Wils | |
| 10,474,363 B1 * | 11/2019 | Cui | G06F 3/0653 |
| 10,732,840 B2 | 8/2020 | Nanda et al. | |
| 11,010,082 B2 | 5/2021 | Nanda et al. | |
| 11,023,333 B2 | 6/2021 | Nanda et al. | |
| 2009/0276593 A1 * | 11/2009 | Jacobson | G06F 3/0611 711/202 |
| 2010/0153617 A1 * | 6/2010 | Miroshnichenko | G06F 3/0635 711/6 |
| 2015/0254126 A1 * | 9/2015 | Wood | G06F 11/0775 714/53 |
| 2016/0210053 A1 * | 7/2016 | Frank | G06F 3/0635 |
| 2018/0364949 A1 * | 12/2018 | Aston | G06F 3/067 |

* cited by examiner

*Primary Examiner* — Sanjiv Shah
*Assistant Examiner* — Alexander J Yoon
(74) *Attorney, Agent, or Firm* — BainwoodHuang

(57) ABSTRACT

Techniques for rebuilding space accounting counters in mapping layers of storage appliances. The techniques include uniquely associating top levels of a mapping layer of a storage appliance with respective storage objects. The techniques further include determining amounts of logical storage space consumed by the respective storage objects from mappings of LBAs of the respective storage objects to virtual blocks of a virtual layer of the storage appliance. The techniques further include determining amounts of physical storage space consumed by the respective storage objects from logged information pertaining to each leaf pointer of a leaf level of the mapping layer that points to a virtual block in the virtual layer, each virtual block being mapped to a physical block in a physical layer of the storage appliance. The techniques further include using multi-threading to determine amounts of logical storage space consumed by dynamically adjustable ranges of the respective storage objects.

17 Claims, 4 Drawing Sheets

REBUILDING SPACE ACCOUNTING COUNTERS IN MAPPING LAYER OF STORAGE APPLIANCES

BACKGROUND

In a data storage system, a storage appliance has read-write input/output (IO) access to storage objects and/or resources such as filesystems, volumes (VOLs), virtual volumes (VVOLs), logical units (LUs), and so on. The storage appliance is configured to receive storage IO requests from one or more client computers over a network. In response to the storage IO requests, the storage appliance performs storage IO operations (e.g., read-write IO operations) to read/write blocks, files, pages, segments, chunks, or any other suitable units of data storage to/from one or more of the storage objects and/or resources. From time to time, a fault may be detected at the storage appliance due to a media error, a metadata inconsistency in a filesystem, or other cause. Filesystem checking (FSCK) may then be performed to recover any filesystem metadata that may have been corrupted, thereby returning the filesystem to a consistent state and restoring its integrity.

SUMMARY

Storage appliances can have drawbacks, however, particularly with regard to how global data deduplication can affect FSCK processing. For example, to achieve increased data reduction, a storage appliance can be configured to perform global data deduplication, in which a large data deduplication domain of the storage appliance can span multiple volume families. However, such a large data deduplication domain can adversely affect the performance of storage space accounting tasks related to FSCK processing, increasing the amount of memory space required to accommodate space accounting bookkeeping data structures and/or decreasing the overall processing speed.

Improved techniques are disclosed herein for rebuilding space accounting counters in mapping layers of storage appliances. The disclosed techniques can be employed in a storage appliance that has multiple logical structural layers including at least a mapping layer, a virtual layer, and a physical layer. The disclosed techniques can include uniquely associating one or more top levels of the mapping layer with one or more storage objects, respectively. The disclosed techniques can further include determining amounts of logical storage space consumed by the respective storage objects from mappings of logical block addresses (LBAs) of the respective storage objects to virtual blocks in the virtual layer. The disclosed techniques can further include determining amounts of physical storage space consumed by the respective storage objects from logged information pertaining to each leaf pointer of a leaf level of the mapping layer that points to a virtual block in the virtual layer, in which each virtual block is mapped to a physical block in a physical layer of the storage appliance. By using multi-threading to determine amounts of logical storage space consumed by dynamically adjustable ranges of the respective storage objects, a high level of processing parallelism (and increased processing speed) can be achieved while maintaining a sufficient amount (or reducing the amount) of memory space required to accommodate space accounting bookkeeping data structures. These benefits are particularly seen in storage appliances that employ a large data deduplication domain during the performance of global data deduplication.

In certain embodiments a method of storage space accounting in a data storage system includes uniquely associating a top level of a mapping layer of a storage appliance with a storage object, determining an amount of logical storage space consumed by the storage object from a mapping of logical block addresses (LBAs) of the storage object to virtual blocks in a virtual layer of the storage appliance, and determining an amount of physical storage space consumed by the storage object from logged information pertaining to each leaf pointer from among a plurality of leaf pointers in a leaf level of the mapping layer that points to a virtual block in the virtual layer, in which each virtual block is mapped to a physical block in a physical layer of the storage appliance.

In certain arrangements, the top level, a mid-level, and the leaf level of the mapping layer are incorporated into a block pointer tree, and the method further includes determining how much of the storage object is mapped by the block pointer tree.

In certain arrangements, the top level of the mapping layer includes a first block pointer array, the mid-level of the mapping layer includes a second block pointer array, and the method further includes determining how many block pointers in the first block pointer array point to the second block pointer array in the mid-level of the mapping layer.

In certain arrangements, the leaf level of the mapping layer includes a leaf pointer array, and the method further includes, having determined how many block pointers in the first block pointer array point to the second block pointer array in the mid-level of the mapping layer, determining how many block pointers in the second block pointer array point to the leaf pointer array in the leaf level of the mapping layer.

In certain arrangements, the virtual layer includes one or more virtual blocks that include valid virtual pointers, each valid virtual pointer points to a physical block in the physical layer, and the method further includes, having determined how many block pointers in the second block pointer array point to the leaf pointer array in the leaf level of the mapping layer, determining how many leaf pointers in the leaf pointer array point to a respective one of the virtual blocks that include valid virtual pointers.

In certain arrangements, the method further includes, for each leaf pointer that points to a respective one of the virtual blocks that include valid virtual pointers, logging, in a log data structure, information pertaining to the leaf pointer, the respective one of the virtual blocks, and one or more identifiers corresponding to the storage object.

In certain arrangements, the method further includes determining, based on the logged information, that the storage object is consuming one or more virtual blocks in the virtual layer.

In certain arrangements, the method further includes determining that the one or more virtual blocks are uniquely owned by the storage object.

In certain arrangements, the method further includes, having determined that the storage object is consuming one or more virtual blocks in the virtual layer, determining an amount of physical storage space consumed by the storage object based on a mapping between the one or more virtual blocks and one or more physical blocks in the physical layer, taking into account how much of the respective physical blocks are compressed.

In certain arrangements, the leaf level of the mapping layer includes a leaf pointer array, the virtual layer includes virtual blocks in a plurality of address ranges that include valid virtual pointers, each valid virtual pointer points to a physical block in the physical layer, and the method further includes, having determined how many block pointers in the second block pointer array point to the leaf pointer array in the leaf level of the mapping layer, determining, for each address range of the virtual blocks, how many leaf pointers in the leaf pointer array point to a respective one of the virtual blocks that include valid virtual pointers.

In certain arrangements, the method further includes, for each leaf pointer that points to a respective one of the virtual blocks in a respective address range of the virtual blocks, logging, in a log data structure, information pertaining to the leaf pointer, the respective one of the virtual blocks, and one or more identifiers corresponding to the storage object.

In certain arrangements, the method further includes determining, based on the logged information for the respective address range of the virtual blocks, that the storage object is consuming one or more virtual blocks in the virtual layer.

In certain arrangements, the method further includes determining that the one or more virtual blocks is uniquely owned by the storage object.

In certain arrangements, the method further includes, having determined that the storage object is consuming one or more virtual blocks in the virtual layer, determining an amount of physical storage space consumed by the storage object based on a mapping between the one or more virtual blocks in the respective address range and one or more physical blocks in the physical layer, taking into account how much of the respective physical blocks are compressed.

In certain arrangements, the method further includes determining, by multi-thread processing of a plurality of storage ranges of the storage object, how much of the storage object is mapped by the block pointer tree.

In certain arrangements, the method further includes dynamically adjusting the plurality of storage ranges of the storage object.

In certain embodiments, a system for storage space accounting in a data storage system includes a memory and processing circuitry configured to execute program instructions out of the memory to uniquely associate a top level of a mapping layer of a storage appliance with a storage object, determine an amount of logical storage space consumed by the storage object from a mapping of logical block addresses (LBAs) of the storage object to virtual blocks in a virtual layer of the storage appliance, and determine an amount of physical storage space consumed by the storage object from logged information pertaining to each leaf pointer from among a plurality of leaf pointers in a leaf level of the mapping layer that points to a virtual block in the virtual layer, in which each virtual block is mapped to a physical block in a physical layer of the storage appliance.

In certain embodiments, a computer program product includes a set of non-transitory, computer-readable media having instructions that, when executed by processing circuitry, cause the processing circuitry to perform a method of storage space accounting in a data storage system, in which the method includes uniquely associating a top level of a mapping layer of a storage appliance with a storage object, determining an amount of logical storage space consumed by the storage object from a mapping of logical block addresses (LBAs) of the storage object to virtual blocks in a virtual layer of the storage appliance, and determining an amount of physical storage space consumed by the storage object from logged information pertaining to each leaf pointer from among a plurality of leaf pointers in a leaf level of the mapping layer that points to a virtual block in the virtual layer, in which each virtual block is mapped to a physical block in a physical layer of the storage appliance.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 2b is a block diagram of a detailed view of a mapping layer included in the multi-layer functional organization of FIG. 2a.

DETAILED DESCRIPTION

Improved techniques are disclosed herein for rebuilding space accounting counters in mapping layers of storage appliances. The disclosed techniques can include uniquely associating one or more top levels of a mapping layer of a storage appliance with one or more storage objects, respectively. The disclosed techniques can further include determining amounts of logical storage space consumed by the respective storage objects from mappings of logical block addresses (LBAs) of the respective storage objects to virtual blocks in a virtual layer of the storage appliance. The disclosed techniques can further include determining amounts of physical storage space consumed by the respective storage objects from logged information pertaining to each leaf pointer of a leaf level of the mapping layer that points to a virtual block in the virtual layer, in which each virtual block is mapped to a physical block in a physical layer of the storage appliance. By using multi-threading to determine amounts of logical storage space consumed by dynamically adjustable ranges of the respective storage objects, a high level of processing parallelism can be achieved while maintaining a sufficient amount of memory space to accommodate space accounting bookkeeping data structures.

Figure 1:
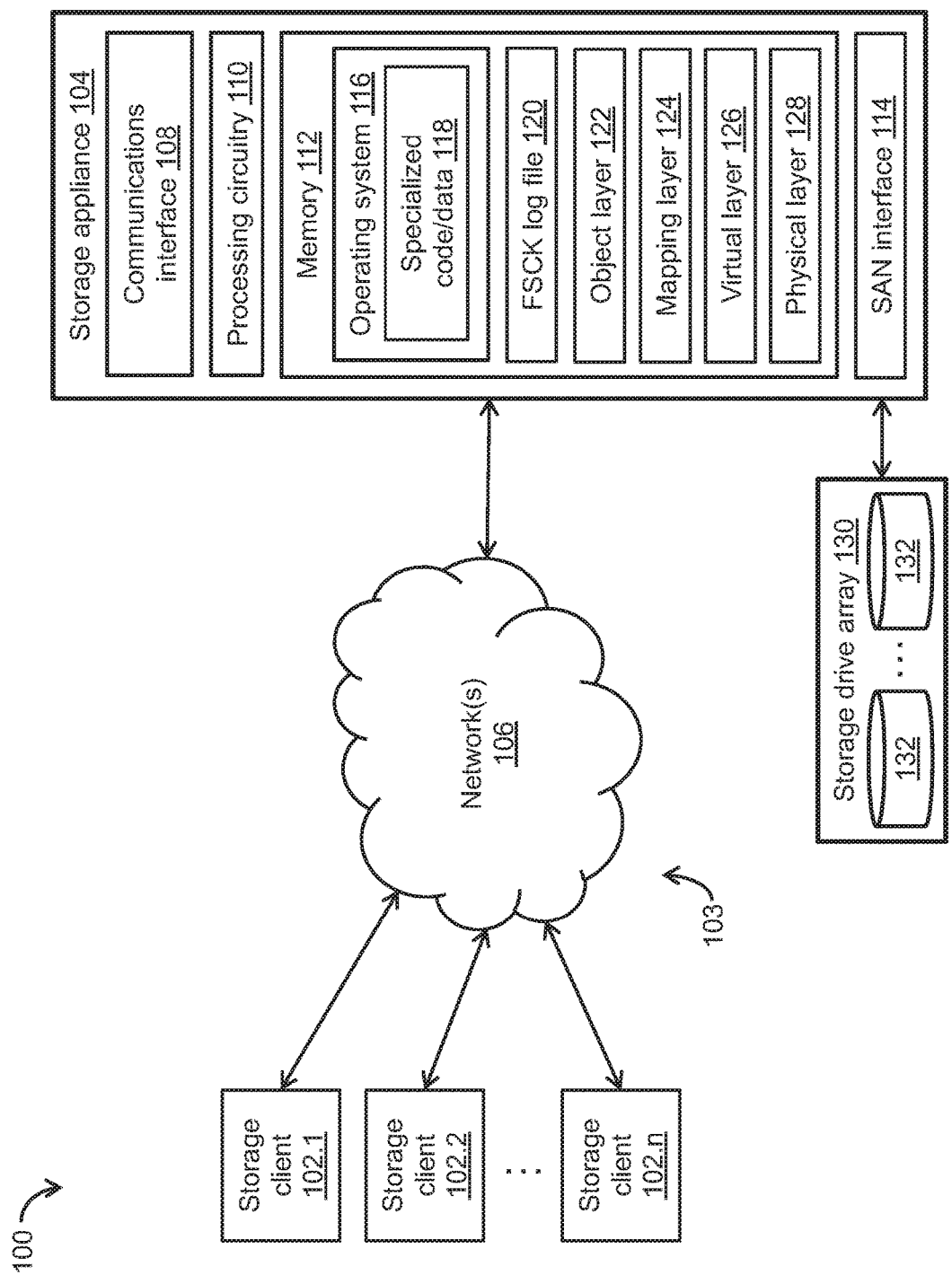
FIG. 1 is a block diagram of an exemplary storage system environment, in which techniques can be practiced for rebuilding space accounting counters in mapping layers of storage appliances.

FIG. 1 depicts an illustrative embodiment of an exemplary storage system environment 100, in which techniques can be practiced for rebuilding space accounting counters in mapping layers of storage appliances. As shown in FIG. 1, the storage system environment 100 can include a plurality of storage client computers (also referred to herein as "storage client(s)") 102.1, 102.2, . . . , 102.n, a storage appliance 104, and a communications medium 103 that includes at least one network 106. For example, each of the plurality of storage clients 102.1, . . . , 102.n can be configured as a web server computer, a file server computer, an email server computer, an enterprise server computer, and/or any other suitable client/server computer or computerized device. The plurality of storage clients 102.1, . . . , 102.n can provide, over the network(s) 106, storage input/output (IO) requests (e.g., small computer system interface (iSCSI) commands, network filesystem (NFS) commands)

to the storage appliance 104. Such storage IO requests (e.g., write IO requests, read IO requests) can direct processing circuitry included in the storage appliance 104 to write or read blocks, files, pages, segments, chunks, and/or any other suitable units of data storage to/from filesystems, volumes (VOLs), virtual volumes (VVOLs), logical units (LUs), or any other suitable storage objects and/or resources maintained in association with the storage appliance 104.

As shown in FIG. 1, the storage appliance 104 can include a communications interface 108, processing circuitry 110, a memory 112, and a network (e.g., SAN) interface 114 or any other suitable interface. The communications interface 108 can include an iSCSI interface, Ethernet interface, FC interface, InfiniBand interface, or any other suitable interface. The communications interface 108 can further include iSCSI adapters, Ethernet adapters, FC adapters, InfiniBand adapters, or any other suitable adapters for converting electronic, optical, and/or wireless signals received over the network(s) 106 to a form suitable for use by the processing circuitry 110. The storage appliance 104 can access, over the SAN interface 114, a storage drive array 130, which can be configured to provide physical storage of storage client data. The storage drive array 130 can include a plurality of physical storage drives 132 such as magnetic disk drives, electronic flash drives, optical drives, and/or any other suitable drives. The storage drive array 130 can be locally attached to an IO channel of the storage appliance 104 while also being accessible over the network(s) 106. In some embodiments, the storage drive array 130 can be implemented as a dual-ported drive, which can be shared between a pair of storage nodes implemented within a dual-node storage appliance.

The memory 112 (see FIG. 1) can include persistent memory (e.g., flash memory, magnetic memory) and/or non-persistent memory (e.g., dynamic random-access memory (DRAM), static random-access memory (SRAM)). The memory 112 can further include an operating system (OS) 116 such as a Linux operating system (OS), Unix OS, Windows OS, or any other suitable operating system. The memory 112 can be configured to store a variety of software constructs realized in the form of specialized code and data 118 (i.e., program instructions and data), as well as a filesystem checking (FSCK) log file 120 (also referred to herein as a "recovery log"), an object layer 122, a mapping layer 124, a virtual layer 126, and a physical layer 128. The specialized code and data 118 can be executed by the processing circuitry 110 to carry out the techniques and/or methods disclosed herein.

Figure 2A:
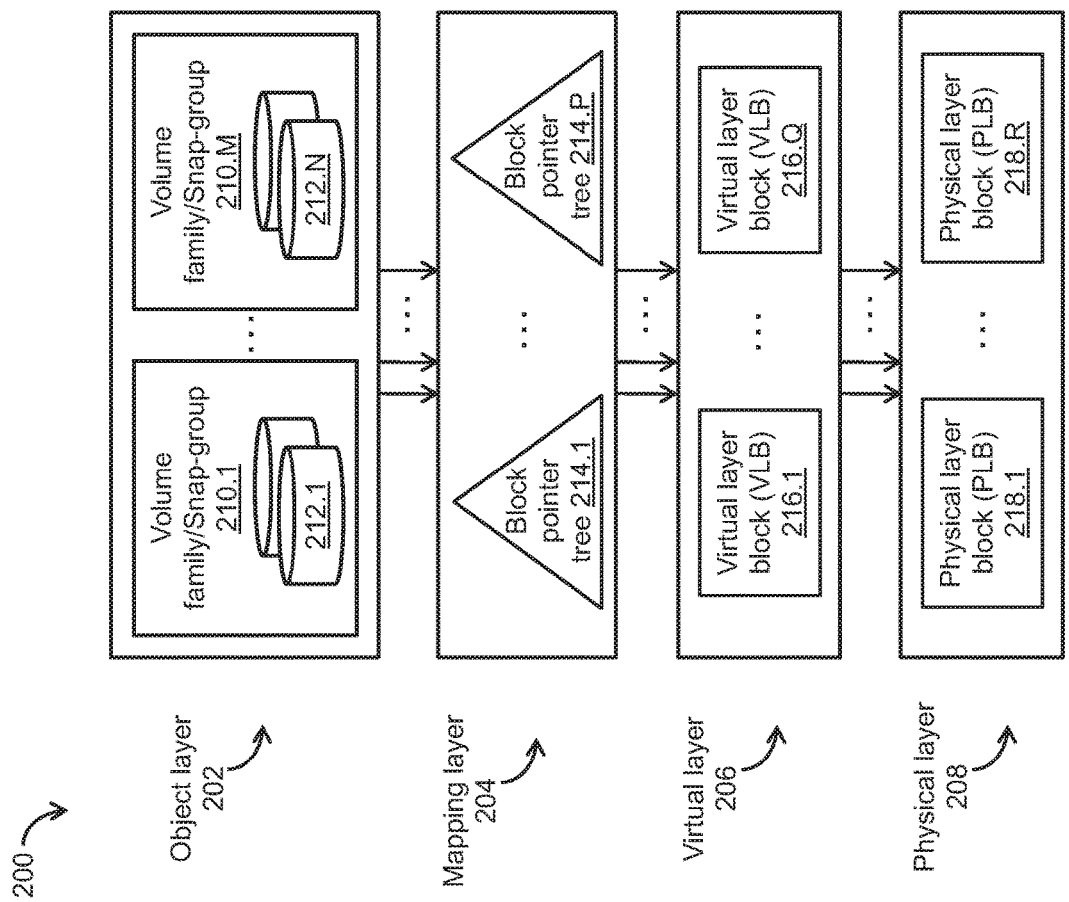
FIG. 2a is a block diagram of an exemplary multi-layer functional organization of a storage appliance that can be employed in the storage system environment of FIG. 1.

FIG. 2a depicts an exemplary multi-layer functional organization 200 of the storage appliance 104 of FIG. 1, including representations of an object layer 202, a mapping layer 204, a virtual layer 206, and a physical layer 208. The object layer 202 is a logical structure configured to establish and maintain a logical view of storage objects such as volumes 212.1, ..., 212.N, as well as present the respective volumes 212.1, ..., 212.N to the plurality of storage clients 102.1, ..., 102.n as objects of storage IO operations (e.g., read-write IO operations). As employed herein, the term "volume" refers to a primary volume or a point-in-time (PIT) copy (also referred to herein as a "snapshot" or "snap") or clone of the primary volume. In some embodiments, the volumes 212.1, ..., 212.N can be organized into volume families and/or snap-groups 210.1, ..., 210.M. Each such snap-group can correspond to a collective set of a primary volume and its snapshots and/or clones and their snapshots, if any. In such a volume organization, there can be block sharing among a primary volume and its snapshots, as well as among snapshots or clones and their snapshots.

The mapping layer 204 (see FIG. 2a) is a logical structure configured to map logical block addresses (LBAs) of storage objects in the object layer 202 (e.g., the volumes 212.1, ..., 212.N) to virtual layer blocks (VLBs) in the virtual layer 206. As shown in FIG. 2a, the mapping layer 204 can include a plurality of block pointer tree data structures (also referred to herein as "block pointer trees") 214.1, ..., 214.P, each of which can include a top level, at least one mid-level, and a leaf level. The leaf level of each block pointer tree 214.1, ..., or 214.P can include a set of block pointers (also referred to herein as "leaf pointers"), each of which can point to a respective VLB in the virtual layer 206.

The virtual layer 206 (see FIG. 2a) is a logical structure configured to provide block virtualization. The virtual layer 206 can include a plurality of VLBs 216.1, ..., 216.Q, each of which can include a block pointer (also referred to herein as a "virtual pointer"). It is noted that data deduplication can be implemented at the virtual level 206. For example, redundant copies of physical layer blocks (PLBs) in the physical layer 208 can be eliminated through data deduplication by creating two or more leaf pointers that point to a single VLB, which, in turn, points to a single copy of the redundant PLBs. Once the leaf pointers have been created, the single copy of the redundant PLBs can be retained while the remaining redundant PLB(s) can be freed or released. In some embodiments, data deduplication implemented at the virtual level 206 can be "global" such that a corresponding data deduplication domain can span multiple volume families. As employed herein, the term "volume family" refers to a collection of storage volumes that can start with a single writable volume (i.e., a "primary volume") and grow with the creation of read-only snaps and writable snaps (also referred to herein as "clones"). It is further noted that a storage volume in a volume family can share none, some, or all of its data blocks with another storage volume in the same volume family.

The physical layer 208 (see FIG. 2a) is a logical structure configured to store a plurality of PLBs 218.1, ..., 218.R, each of which can correspond to an aggregation of compressed blocks, individually compressed blocks, and/or uncompressed blocks. Each PLB 218.1, ..., or 218.R in the physical layer 208 can be pointed to by a virtual pointer of a VLB in the virtual layer 206. Although the layer 208 is referred to herein using the adjective, "physical," the storage drive array 130 (see FIG. 1) is actually responsible for the physical storage of client data.

During operation, a fault may be detected at the storage appliance 104 (see FIG. 1) due to a media error, a metadata inconsistency in a filesystem, or other cause. For example, upon detection of a fault due to a filesystem metadata inconsistency, the storage appliance 104 may quiesce (or "freeze") the filesystem and be taken offline so that FSCK processing can be performed to recover any corrupted filesystem metadata and return the filesystem to a consistent state. Such FSCK processing can include storage space accounting tasks for rebuilding space accounting counters in the mapping layer 204 (see FIG. 2a) of the storage appliance 104. For example, such storage space accounting tasks can include determining an amount of logical storage space consumed by a storage object and an amount of physical storage space consumed by the storage object. The disclosed techniques for rebuilding space accounting counters can include uniquely associating one or more top levels of the mapping layer 204 with one or more storage objects, respectively. The disclosed techniques can further include determining amounts of logical storage space consumed by the respective storage objects from mappings of logical block addresses (LBAs) of the respective storage objects to VLBs 216.1, . . . , 216.Q in the virtual layer 206. The disclosed techniques can further include determining amounts of physical storage space consumed by the respective storage objects from logged information pertaining to each leaf pointer of a leaf level of the mapping layer 204 that points to a VLB in the virtual layer 206, in which each VLB is mapped to one of the PLBs 218.1, . . . , 218.R in the physical layer 208. By using multi-threading to determine amounts of logical storage space consumed by dynamically adjustable ranges of the respective storage objects, a high level of processing parallelism can be achieved while maintaining a sufficient amount of memory space to accommodate space accounting bookkeeping data structures.

Figure 2B:
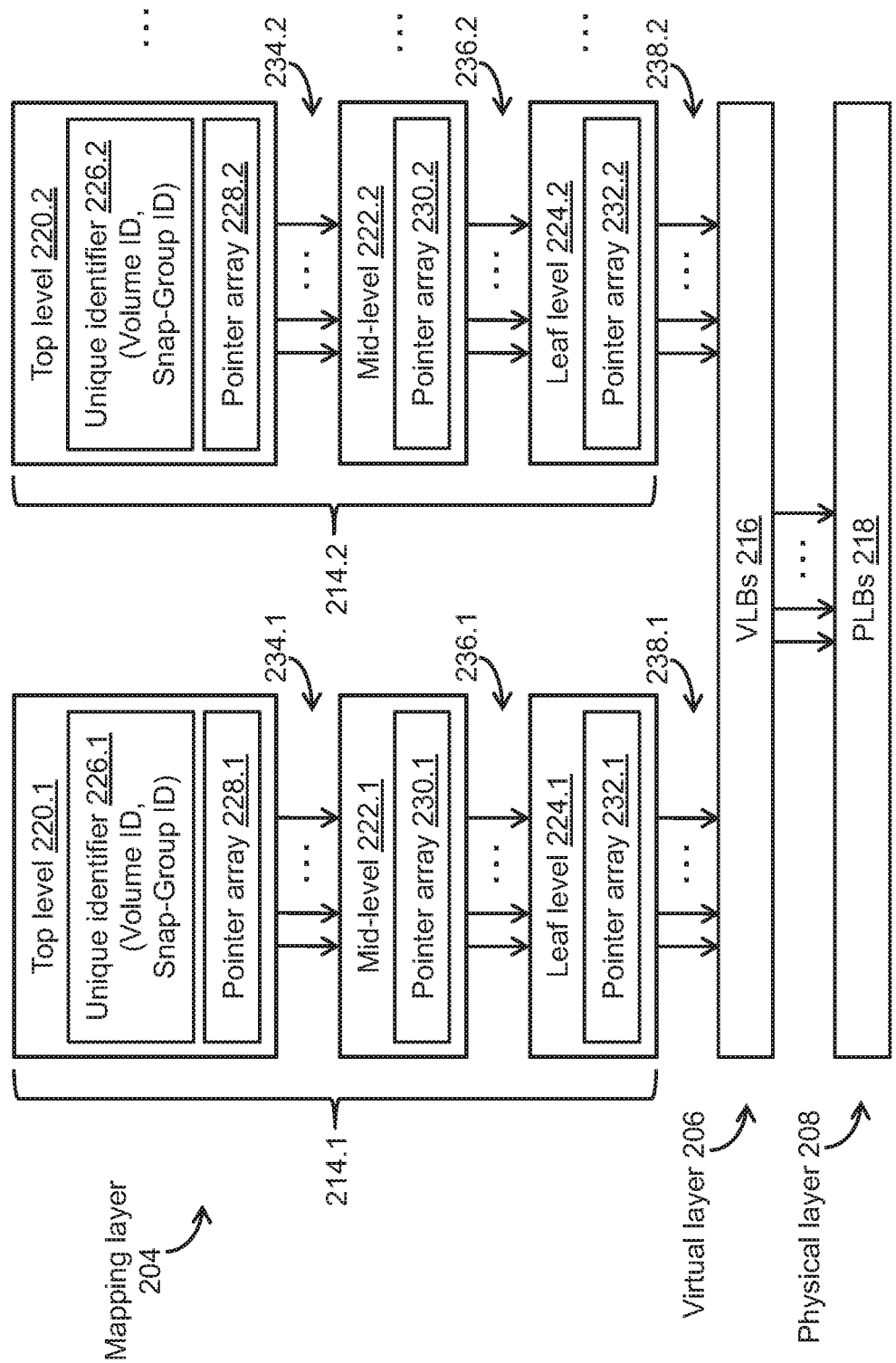

The disclosed techniques for rebuilding space accounting counters in mapping layers of storage appliances will be further understood with reference to the following illustrative example and FIGS. 1, 2*a*, and 2*b*. In this example, it is assumed that a fault is detected at the storage appliance 104 (see FIG. 1) due to metadata inconsistency in a filesystem. Upon detection of the fault, the storage appliance 104 quiesces (or "freezes") the filesystem and is taken offline to perform FSCK processing, which includes storage space accounting tasks for rebuilding space accounting counters in the mapping layer 204 (see FIG. 2*a*).

FIG. 2*b* depicts a detailed view of the mapping layer 204, which can include at least two block pointer trees 214.1, 214.2. As shown in FIG. 2*b*, the block pointer tree 214.1 can include a top level 220.1, a mid-level 222.1, and a leaf level 224.1. The top level 220.1 can include a set of block pointers 234.1 implemented by a block pointer array 228.1. Similarly, the mid-level 222.1 can include a set of block pointers 236.1 implemented by a block pointer array 230.1, and the leaf level 224.1 can include a set of leaf pointers 238.1 implemented by a leaf pointer array 232.1. Likewise, the block pointer tree 214.2 can include a top level 220.2, a mid-level 222.2, and a leaf level 224.2. The top level 220.2 can include a set of block pointers 234.2 implemented by a block pointer array 228.2. Similarly, the mid-level 222.2 can include a set of block pointers 236.2 implemented by a block pointer array 230.2, and the leaf level 224.2 can include a set of leaf pointers 238.2 implemented by a leaf pointer array 232.2. In this example, the top level 220.1 of the block pointer tree 214.1 is uniquely associated with a first storage object, such as a volume 212.1 in the object layer 202 (see FIG. 2*a*). In this example, the top level 220.1 of the block pointer tree 214.1 is effectively "owned" by the volume 212.1. Further, the unique association between the top level 220.1 and the volume 212.1 is specified by identifying information, which includes at least one unique identifier 226.1 (e.g., volume ID, snap-group ID) corresponding to the volume 212.1. Likewise, the top level 220.2 of the block pointer tree 214.2 is uniquely associated with a second storage object, such as a volume 212.2 in the object layer 202 (see FIG. 2*a*). In this example, the top level 220.2 of the block pointer tree 214.2 is effectively "owned" by the volume 212.2. Further, the unique association between the top level 220.2 and the volume 212.2 is specified by identifying information, which includes at least one unique identifier 226.2 (e.g., volume ID, snap-group ID) corresponding to the volume 212.2. In some embodiments, each of the unique identifiers 226.1, 226.2 can include one or more of a volume ID, a snap-group ID, a storage container ID, a tenant ID, and/or any other suitable ID(s) or other information corresponding to the first and second storage objects. As employed herein, the term "storage container" refers to a container of virtual volumes (VVOLs), and the term "tenant" refers to a storage object for multiple storage containers.

In this example, each of the top levels 220.1, 220.2 of the block pointer trees 214.1, 214.2, respectively, corresponds to 512 gigabytes (Gb) of storage space. It is noted, however, that the volumes 212.1, 212.2 uniquely associated with the top levels 220.1, 220.2, respectively, may not use the entire 512 Gb of available storage space. In some embodiments, a storage volume may be large and own multiple top levels of block pointer trees with each top level being exclusive to that storage volume. Further, a total of 512 block pointers are included in the block pointer set 234.1 implemented by the block pointer array 228.1 of the top level 220.1, and a total of 512 block pointers are included in the block pointer set 234.2 implemented by the block pointer array 228.2 of the top level 220.2. Each block pointer of the block pointer set 234.1 can point to 1 Gb of address space in the mid-level 222.1 of the block pointer tree 214.1. Likewise, each block pointer of the block pointer set 234.2 can point to 1 Gb of address space in the mid-level 222.2 of the block pointer tree 214.2. Still further, a total of 512 block pointers are included in the block pointer set 236.1 implemented by the block pointer array 230.1 of the mid-level 222.1, and a total of 512 block pointers are included in the block pointer set 236.2 implemented by the block pointer array 230.2 of the mid-level 222.2. Each block pointer of the block pointer set 236.1 can point to 2 megabytes (Mb) of address space in the leaf level 224.1 of the block pointer tree 214.1. Likewise, each block pointer of the block pointer set 236.2 can point to 2 Mb of address space in the leaf level 224.2 of the block pointer tree 214.2. Yet further, a total of 512 leaf pointers are included in the leaf pointer set 238.1 implemented by the leaf pointer array 232.1 of the leaf level 224.1, and a total of 512 leaf pointers are included in the leaf pointer set 238.2 implemented by the leaf pointer array 232.2 of the leaf level 224.2. Each leaf pointer of the leaf pointer set 238.1 can point to 4 kilobytes (Kb) of address space defined by a VLB in the virtual layer 206. Likewise, each leaf pointer of the leaf pointer set 238.2 can point to 4 Kb of address space defined by a VLB in the virtual layer 206. The VLBs 216 in the virtual layer 206 can map to PLBs 218 in the physical layer 208. It is noted that each of the PLBs 218 in the physical layer 208 can correspond to contiguous address space, and that the VLBs 216 in the virtual layer 206 can have contiguous LBAs.

In this example, the storage space accounting tasks for rebuilding space accounting counters in the mapping layer 204 are performed in two (2) phases, namely, a first phase for determining how much of the volumes 212.1, 212.2 are mapped by the block pointer trees 214.1, 214.2, respectively, and a second phase for determining how much physical storage space is consumed by the respective volumes 212.1, 212.2. In the first phase of storage space accounting, the mapped storage space (or "mapped space") corresponds to the logical storage space (or "logical space") of the respective volumes 212.1, 212.2.

The first phase of storage space accounting is described below with reference to the volume 212.1, which effectively owns the top level 220.1 of the block pointer tree 214.1. It should be understood that the first phase of storage space accounting can be described in a similar manner with reference to the volume 212.2, which effectively owns the top level 220.2 of the block pointer tree 214.2. In this example, it is assumed that the volume 212.1 is a 100 Gb volume, in which 10 Gb of the volume 212.1 contains data, and 90 Gb of the volume 212.1 contains no data. In the first phase of storage space accounting, a determination is made as to how many block pointers in the block pointer set 234.1 point to the block pointer array 230.1 in the mid-level 222.1 of the block pointer tree 214.1. As described herein, each block pointer of the block pointer set 234.1 can point to 1 Gb of address space in the mid-level 222.1. Accordingly, for each block pointer in the block pointer set 234.1 that points to the block pointer array 230.1 in the mid-level 222.1, the corresponding 1 Gb of address space in the mid-level 222.1 is regarded as being mapped space If it is determined that one or more block pointers in the block pointer set 234.1 point to the block pointer array 230.1 in the mid-level 222.1, then a further determination is made as to how many block pointers in the block pointer set 236.1 point to the leaf pointer array 232.1 in the leaf level 224.1 of the block pointer tree 214.1. As described herein, each block pointer of the block pointer set 236.1 can point to 2 Mb of address space in the leaf level 224.1. Accordingly, for each block pointer in the block pointer set 236.1 that points to the leaf pointer array 232.1 in the leaf level 224.1, the corresponding 2 Mb of address space in the leaf level 224.1 is regarded as being mapped space.

If it is determined that one or more block pointers in the block pointer set 236.1 point to the leaf pointer array 232.1 in the leaf level 224.1, then a further determination is made as to how many leaf pointers in the leaf pointer set 238.1 point to VLBs 216 in the virtual layer 206 that include valid virtual pointers (i.e., virtual pointers that point to PLBs 218 in the physical layer 208). As described herein, each leaf pointer of the leaf pointer set 238.1 can point to 4 Kb of address space defined by a VLB in the virtual layer 206. Accordingly, for each leaf pointer in the leaf pointer set 238.1 that points to a VLB containing a valid virtual pointer, the corresponding 4 Kb of address space in the virtual layer 206 is regarded as being mapped space.

In addition, for each leaf pointer in the leaf pointer set 238.1 that points to a VLB containing a valid virtual pointer, information pertaining to the leaf pointer and the VLB, as well as one or more identifiers (e.g., volume ID, snap-group ID) corresponding to the volume 212.1, are logged in the FSCK log file 120 (i.e., the recovery log). In some embodiments, the FSCK log file 120 can be configured to accommodate multiple recovery logs, in which each recovery log corresponds to a specified address range of VLBs in the virtual layer 206. For example, for leaf pointers that point to VLBs within an address range of "0" to "99," information pertaining to the respective leaf pointers and VLBs may be logged or appended to a first recovery log of the FSCK log file 120. Further, for leaf pointers that point to VLBs within an address range of "100" to "199," information pertaining to the respective leaf pointers and VLBs may be logged or appended to a second recovery log of the FSCK log file 120, and so on.

In some embodiments, multi-threading can be employed in the processing of the first phase of storage space accounting to achieve a high level of processing parallelism while maintaining a sufficient amount of memory space to accommodate space accounting bookkeeping data structures. In this example, each thread of processing can be performed to determine the amount of mapped space for a 1 Gb range of storage of the volume 212.1, or any other suitable range of storage. As described herein, it is assumed that the volume 212.1 is a 100 Gb volume, and therefore one hundred (100) threads of processing can be performed in parallel to determine the total amount of mapped space for the volume 212.1. For each thread of processing, the amount of mapped space at each level of the block pointer tree 214.1 (i.e., the top level 220.1, the mid-level 222.1, the leaf level 224.1) is recorded in the memory 112. Once all one hundred threads of processing have completed, the recorded amounts of mapped space for the respective levels 220.1, 222.1, 224.1 are added up to obtain the total mapped (or logical) space for the volume 212.1 having the unique identifier 226.1 (i.e., volume ID). Having determined the total mapped (or logical) space for the volume 212.1, similar multi-threading processing can be performed to determine the total mapped (or logical) space for the volume 212.2. It is noted that the range of volume storage space for which amounts of mapped space are determined can be dynamically adjusted to achieve an optimal level of processing parallelism while maintaining sufficient space in the memory 112 for the space accounting bookkeeping data structures.

The second phase of storage space accounting is described below with reference to the volume 212.1, which effectively owns the top level 220.1 of the block pointer tree 214.1. It should be understood that the second phase of storage space accounting can be described in a similar manner with reference to the volume 212.2, which effectively owns the top level 220.2 of the block pointer tree 214.2. As described herein, the second phase can be performed to determine how much physical storage space is consumed by the respective volumes 212.1, 212.2. Knowing how much physical storage space is consumed by a volume, volume family, snap-group, or other storage object can be helpful in determining how much physical storage space will be freed or released if that volume, volume family, snap-group, or other storage object is deleted. It is noted that the physical storage space consumed by a storage object is different from its corresponding total mapped (or logical) space. For example, data blocks of the storage object may be deduplicated (or deduped), compressed, and/or shared between a primary volume and its snapshot(s). Such data deduplication may cause two leaf pointers of block pointer trees belonging to two different volume families to point to the same VLB in a virtual layer of a storage appliance. Further, such block sharing may cause two leaf pointers of a block pointer tree belonging to a particular snap-group to point to the same VLB in the virtual layer. The total mapped (or logical) space for the storage object can therefore be larger than the physical storage space consumed by the storage object.

In the second phase of storage space accounting, the logged information for each specified address range of the VLBs 216 in the virtual layer 206 is read from the recovery log(s) in the FSCK log file 120. For example, with regard to the volume 212.1, the logged information for VLBs in the address range "0" to "99" may be read from the first recovery log of the FSCK log file 120, and, for all VLBs within that address range, a determination may be made as to which volumes and/or snap-groups are consuming the VLBs. It is noted that the volume ID for the volume 212.1 (as well as IDs for any other volumes and/or snap-groups consuming VLBs in the address range "0" to "99") can be obtained from the information logged in the first recovery file. Having determined that the volume 212.1 is consuming the VLBs in the address range "0" to "99", the amount of physical storage space consumed by the volume 212.1 can be determined based on the mapping between those VLBs and the PLBs 218 in the physical layer 208, taking into account how much of those PLBs in the physical layer 208 are compressed. The logged information for VLBs in the address range "100" to "199" may then be read from the second recovery log of the FSCK log file 120, and, for all VLBs within that address range, a determination may be made as to which volumes and/or snap-groups are consuming the VLBs. It is further noted that the volume ID for the volume 212.1 (as well as IDs for any other volumes and/or snap-groups consuming the VLBs in the address range "100" to "199") can be obtained from the information logged in the second recovery file. Having determined that the volume 212.1 is consuming the VLBs in the address range "100" to "199", a further amount of physical storage space consumed by the volume 212.1 can be determined based on the mapping between those VLBs and the PLBs 218 in the physical layer 208, again taking into account how much of those PLBs in the physical layer 208 are compressed. It should be understood that logged information for additional address ranges of VLBs can be handled in likewise fashion.

It is further noted that, in some cases, volumes from different volume families and/or snap-groups may consume the same VLB(s) in the virtual layer 206. As a result, if one of those volume families and/or snap-groups is deleted, then the amount of physical storage space to which those VLB(s) are mapped will not be freed or released. For this reason, the information logged in the recovery logs of the FSCK log file 120 can further include an indication of whether a VLB having a valid virtual pointer and being pointed to by a leaf pointer is uniquely owned by a volume family or snap-group that consumes the VLB. If the VLB is determined to be uniquely owned by the volume family or snap-group consuming the VLB, then the physical storage space to which the VLB is mapped represents storage space that will be freed or released when the volume family or snap-group is deleted or moved to another storage appliance. The physical storage space consumed by the volume family or snap-group can then be determined taking into account whether a VLB consumed by the volume family or snap-group is uniquely owned by the volume family or snap-group.

Figure 3:
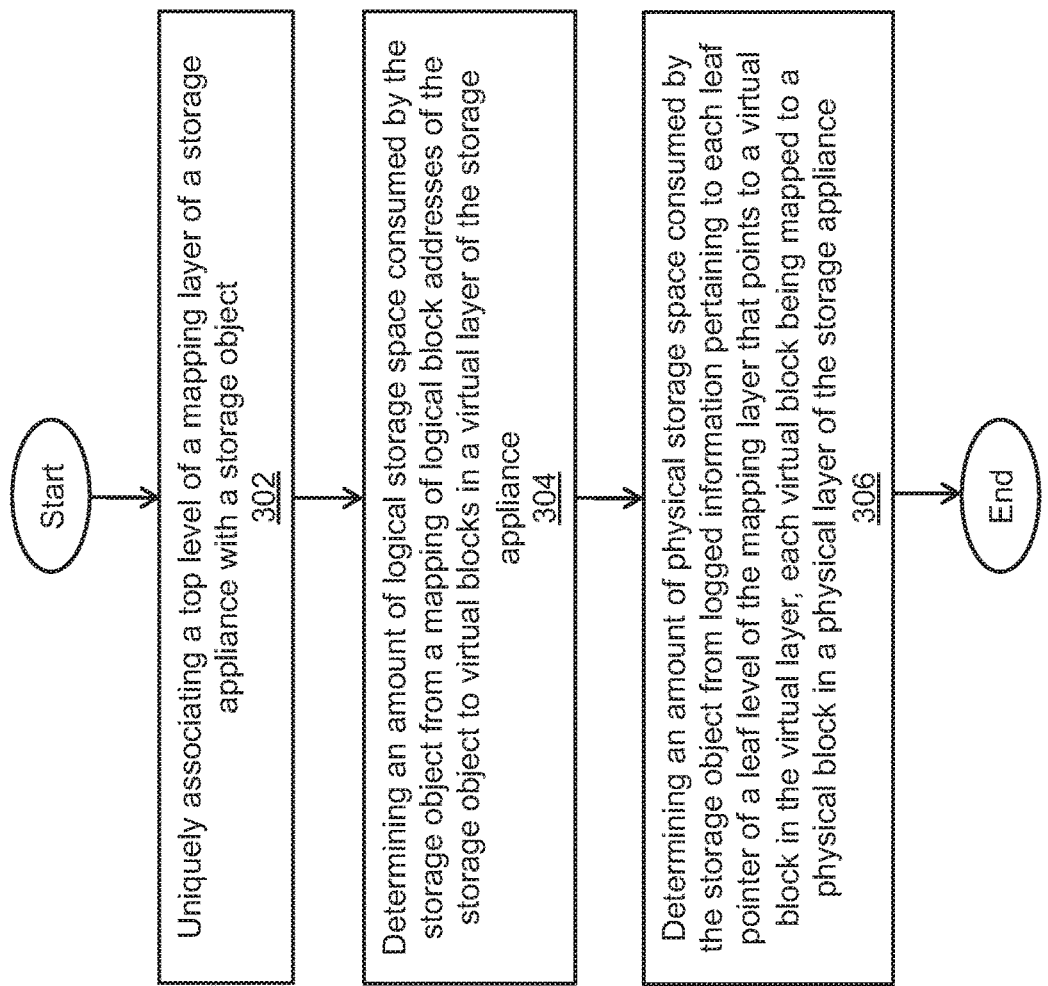
FIG. 3 is a flow diagram of an exemplary method of rebuilding space accounting counters in mapping layers of storage appliances.

An exemplary method of rebuilding space accounting counters in mapping layers of storage appliances is described below with reference to FIG. 3. As depicted in block 302, a top level of a mapping layer of a storage appliance is uniquely associated with a storage object. As depicted in block 304, an amount of logical storage space consumed by the storage object is determined from a mapping of logical block addresses (LBAs) of the storage object to virtual blocks in a virtual layer of the storage appliance. As depicted in block 306, an amount of physical storage space consumed by the storage object is determined from logged information pertaining to each leaf pointer of a leaf level of the mapping layer that points to a virtual block in the virtual layer, each virtual block being mapped to a physical block in a physical layer of the storage appliance.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or simply "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

A computer program product can be configured to deliver all or a portion of specialized code and data for implementing the disclosed techniques and/or methods. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by one or more processors or processing circuitry, the various techniques and/or methods disclosed herein.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of storage space accounting in a data storage system, comprising:
providing a mapping layer of a storage appliance, the mapping layer including a plurality of block pointer trees, the plurality of block pointer trees including at least a first block pointer tree, the first block pointer tree having a first top level, a first mid-level, and a first leaf level;
implementing data deduplication in a virtual layer of the storage appliance;
uniquely associating the first top level of the first block pointer tree with a first storage object;
determining a first amount of logical storage space consumed by the first storage object from a first mapping of logical block addresses (LBAs) of the first storage object to a plurality of first virtual blocks in the virtual layer in which the data deduplication is implemented;
logging, at intervals, first information pertaining to a plurality of first leaf pointers in the first leaf level of the first block pointer tree that point to the plurality of first virtual blocks in the virtual layer, the logging of the first information including logging, at each interval for each first virtual block, an indication of whether the first virtual block is currently uniquely owned by the first storage object, each first virtual block being mapped to a respective physical block from among a plurality of physical blocks in a physical layer of the storage appliance;
determining a first amount of physical storage space consumed by the first storage object from the logged first information, the determining of the first amount of physical storage space including determining, from the logged indication for each first virtual block, that the plurality of first virtual blocks are currently uniquely owned by the first storage object; and
in response to determining that plurality of first virtual blocks are uniquely owned by the first storage object, deleting the first storage object from the storage appliance or moving the first storage object to a different storage appliance, the deleting or moving of the first storage object including releasing the respective physical block to which each first virtual block is mapped.

2. The method of claim 1 wherein the determining of the first amount of logical storage space consumed by the first storage object includes determining how much of the first storage object is mapped by the first block pointer tree.

3. The method of claim 2 wherein the first top level of the mapping layer includes a first block pointer array, the first mid-level of the mapping layer includes a second block pointer array, and wherein the determining of how much of the first storage object is mapped by the first block pointer tree includes determining how many block pointers in the first block pointer array point to the second block pointer array in the first mid-level of the mapping layer.

4. The method of claim 3 wherein the first leaf level of the mapping layer includes a leaf pointer array, and wherein the determining of how much of the first storage object is mapped by the first block pointer tree includes, having determined how many block pointers in the first block pointer array in the first top level of the mapping layer point to the second block pointer array in the first mid-level of the mapping layer, determining how many block pointers in the second block pointer array in the first mid-level of the mapping layer point to the first leaf pointer array in the first leaf level of the mapping layer.

5. The method of claim 4 wherein the virtual layer includes one or more of the plurality of first virtual blocks that include valid virtual pointers, and wherein the determining of how much of the first storage object is mapped by the first block pointer tree includes, having determined how many block pointers in the second block pointer array in the first mid-level of the mapping layer point to the first leaf pointer array in the first leaf level of the mapping layer, determining how many of the plurality of first leaf pointers in the first leaf pointer array point to the plurality of first virtual blocks that include valid virtual pointers.

6. The method of claim 5 wherein the determining of how much of the first storage object is mapped by the first block pointer tree includes, for each first leaf pointer that points to a respective one of the plurality of first virtual blocks that include valid virtual pointers, logging, in a log data structure, the logged first information pertaining to the plurality of first leaf pointers, the respective one of the plurality of first virtual blocks that include valid virtual pointers, and one or more identifiers corresponding to the first storage object.

7. The method of claim 2 wherein the determining of how much of the first storage object is mapped by the first block pointer tree includes determining, by multi-thread processing of a plurality of storage ranges of the first storage object, how much of the first storage object is mapped by the first block pointer tree.

8. The method of claim 7 wherein the determining of how much of the first storage object is mapped by the first block pointer tree further includes dynamically adjusting the plurality of storage ranges of the first storage object.

9. The method of claim 4 wherein the virtual layer includes one or more of the plurality of first virtual blocks in one or more of a plurality of address ranges that include valid virtual pointers, and wherein the determining of how much of the first storage object is mapped by the block pointer tree includes, having determined how many block pointers in the second block pointer array in the first mid-level of the mapping layer point to the first leaf pointer array in the first leaf level of the mapping layer, determining, for each address range, how many of the plurality of first leaf pointers in the first leaf pointer array point to the plurality of first virtual blocks in the one or more of the plurality of address ranges that include valid virtual pointers.

10. The method of claim 9 wherein the determining of how much of the first storage object is mapped by the first block pointer tree includes, for each first leaf pointer that points to a respective one of the plurality of first virtual blocks in a respective one of the plurality of address ranges, logging, in a log data structure, the logged first information pertaining to the plurality of first leaf pointers, the respective one of the plurality of first virtual blocks in the respective one of the plurality of address ranges that include valid virtual pointers, and one or more identifiers corresponding to the first storage object.

11. The method of claim 10 further comprising:
determining, based on the logged first information for the respective one of the plurality of address ranges, that the first storage object is consuming one or more of the plurality of first virtual blocks in the virtual layer.

12. The method of claim 11 further comprising:
having determined that the plurality of first virtual blocks are uniquely owned by the first storage object, determining an amount of physical storage space consumed by the first storage object based on a mapping between the plurality of first virtual blocks in the respective one of the plurality of address ranges and one or more of the plurality of physical blocks in the physical layer, taking into account how much of the one or more of the plurality of physical blocks are compressed.

13. The method of claim 1 further comprising:

having determined that the plurality of first virtual blocks are uniquely owned by the first storage object, determining an amount of physical storage space consumed by the first storage object based on a mapping between the plurality of first virtual blocks and one or more of the plurality of physical blocks in the physical layer, taking into account how much of the one or more of the plurality of physical blocks are compressed.

14. A system for storage space accounting in a data storage system, comprising:

a memory; and processing circuitry configured to execute program instructions out of the memory to:

provide a mapping layer of a storage appliance, the mapping layer including a plurality of block pointer trees, the plurality of block pointer trees including at least a first block pointer tree, the first block pointer tree having a first top level, a first mid-level, and a first leaf level;

implementing data deduplication in a virtual layer of the storage appliance;

uniquely associate the first top level of the first block pointer tree with a first storage object;

determine a first amount of logical storage space consumed by the first storage object from a first mapping of logical block addresses (LBAs) of the first storage object to a plurality of first virtual blocks in the virtual layer in which the data deduplication is implemented;

log, at intervals, first information pertaining to a plurality of first leaf pointers in the first leaf level of the first block pointer tree that point to the plurality of first virtual blocks in the virtual layer including logging, at each interval for each first virtual block, an indication of whether the first virtual block is currently uniquely owned by the first storage object, each first virtual block being mapped to a respective physical block from among a plurality of physical blocks in a physical layer of the storage appliance;

determine a first amount of physical storage space consumed by the first storage object from the logged first information including determining, from the logged indication for each first virtual block, that the plurality of first virtual blocks are currently uniquely owned by the first storage object;

and in response to determining that plurality of first virtual blocks are uniquely owned by the first storage object, deleting the first storage object from the storage appliance or moving the first storage object to a different storage appliance, the deleting or moving of the first storage object including releasing the respective physical block to which each first virtual block is mapped.

15. The system of claim 14 wherein the processing circuitry is further configured to execute the program instructions out of the memory to determine how much of the first storage object is mapped by the first block pointer tree.

16. A computer program product including a set of non-transitory, computer-readable media having instructions that, when executed by processing circuitry, cause the processing circuitry to perform a method of storage space accounting in a data storage system, the method comprising:

providing a mapping layer of a storage appliance, the mapping layer including a plurality of block pointer trees, the plurality of block pointer trees including at least a first block pointer tree, the first block pointer tree having a first top level, a first mid-level, and a first leaf level;

implementing data deduplication in a virtual layer of the storage appliance;

uniquely associating the first top level of the first block pointer tree with a first storage object;

determining a first amount of logical storage space consumed by the first storage object from a first mapping of logical block addresses (LBAs) of the first storage object to a plurality of first virtual blocks in the virtual layer in which the data deduplication is implemented;

logging, at intervals, first information pertaining to a plurality of first leaf pointers in the first leaf level of the first block pointer tree that point to the plurality of first virtual blocks in the virtual layer, the logging of the first information including logging, at each interval for each first virtual block, an indication of whether the first virtual block is currently uniquely owned by the first storage object, each first virtual block being mapped to a respective physical block from among a plurality of physical blocks in a physical layer of the storage appliance;

determining a first amount of physical storage space consumed by the first storage object from the logged first information, the determining of the first amount of physical storage space including determining, from the logged indication for each first virtual block, that the plurality of first virtual blocks are currently uniquely owned by the first storage object;

and in response to determining that plurality of first virtual blocks are uniquely owned by the first storage object, deleting the first storage object from the storage appliance or moving the first storage object to a different storage appliance, the deleting or moving of the first storage object including releasing the respective physical block to which each first virtual block is mapped.

17. The computer program product of claim 16 wherein the determining of the first amount of logical storage space consumed by the first storage object includes determining how much of the first storage object is mapped by the first block pointer tree.

* * * * *